(12) United States Patent
Gregerson et al.

(10) Patent No.: US 7,997,493 B2
(45) Date of Patent: Aug. 16, 2011

(54) DUAL-APERATURE BARCODE SCANNER WITH TETHER-FREE TOWER HOUSING

(75) Inventors: David L. Gregerson, Lawrenceville, GA (US); Paul O. Detwiler, Lawrenceville, GA (US); John R. Johnson, Buford, GA (US)

(73) Assignee: NCR Corporation, Duluth, GA (US)

( * ) Notice: Subject to any disclaimer, the term of this patent is extended or adjusted under 35 U.S.C. 154(b) by 254 days.

(21) Appl. No.: 11/736,710

(22) Filed: Apr. 18, 2007

(65) Prior Publication Data

US 2008/0257963 A1   Oct. 23, 2008

(51) Int. Cl.
*G02B 26/00* (2006.01)
(52) U.S. Cl. .................................................. 235/462.35
(58) Field of Classification Search .............. 235/462.35
See application file for complete search history.

(56) References Cited

U.S. PATENT DOCUMENTS

| | | | |
|---|---|---|---|
| 5,973,318 A * | 10/1999 | Plesko | 250/227.22 |
| 6,105,866 A * | 8/2000 | Morrison et al. | 235/383 |
| 6,357,659 B1 * | 3/2002 | Kelly et al. | 235/462.01 |
| 6,592,033 B2 * | 7/2003 | Jennings et al. | 235/385 |
| 6,866,197 B1 * | 3/2005 | Detwiler et al. | 235/462.39 |
| 2003/0209600 A1 * | 11/2003 | Collins et al. | 235/383 |
| 2004/0140359 A1 * | 7/2004 | Learmonth et al. | 235/441 |
| 2004/0206825 A1 * | 10/2004 | Schmidt et al. | 235/462.46 |
| 2005/0094215 A1 * | 5/2005 | Nagasaka | 358/406 |
| 2006/0038009 A1 * | 2/2006 | Russell et al. | 235/383 |
| 2008/0255790 A1 * | 10/2008 | Roquemore et al. | 702/101 |

OTHER PUBLICATIONS

Magellan 8500 Product Reference Guide, Aug. 2006, PSC Inc., Retrieved on May 5, 2010 from <http://www.elis-zagreb.hr/user%20manuali/Samost/MG%208500%20QR.pdf>.*

* cited by examiner

*Primary Examiner* — Daniel A Hess
*Assistant Examiner* — David Tardif
(74) *Attorney, Agent, or Firm* — Paul W. Martin; Peter Priest

(57) ABSTRACT

A dual-aperture barcode scanner with tether-free housing. The scanner includes vertical portion including switches and a housing adjacent to but separated from the switches.

8 Claims, 3 Drawing Sheets

DUAL-APERATURE BARCODE SCANNER WITH TETHER-FREE TOWER HOUSING

BACKGROUND

Dual-aperture scanners have a tower that extends above a checkstand. The tower includes elements that may periodically require servicing, such as buttons, speakers, and light emitting diodes. Additionally, this space may be used to contain other serviceable components, such as an electronic article surveillance antenna, a radio frequency identification antenna, and other electronics.

The tower may include a housing that seals the tower. The housing may include one or more pieces, including a bezel portion that frames a vertical window in the tower. The bezel portion may include switches and indicator lights.

It would be desirable to provide a dual-aperture barcode scanner with a tether-free tower housing so that technicians may more easily remove the tower housing to service components within the tower.

SUMMARY

A dual-aperture barcode scanner with a tether-free tower housing is provided.

A dual-aperture barcode scanner with tether-free housing. The scanner includes vertical portion including switches and a housing adjacent to but separated from the switches.

DETAILED DESCRIPTION

Figure 1:
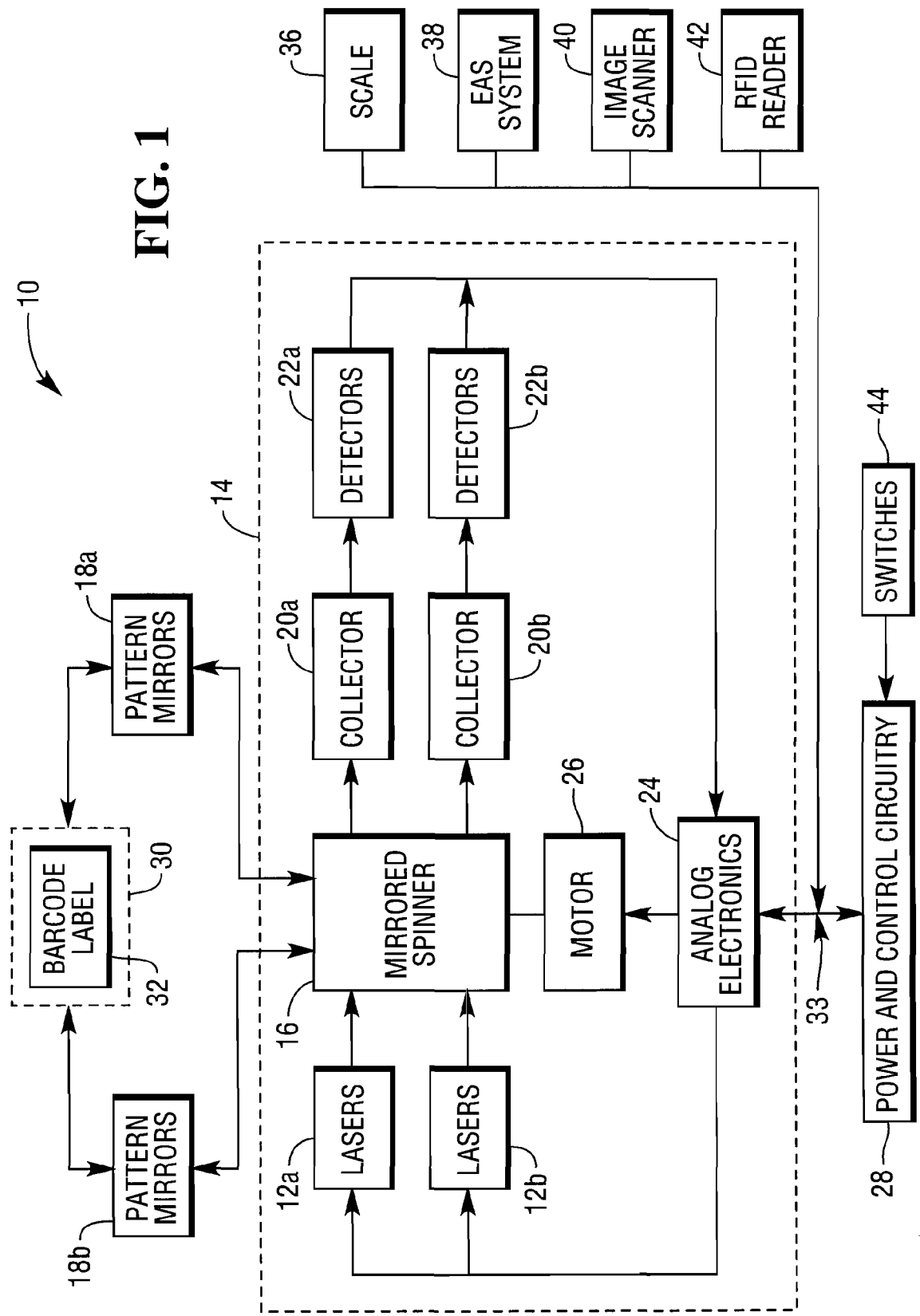
FIG. 1 is a block diagram of an example barcode scanner.

With reference to FIG. 1, an example embodiment of optical scanner 10 includes optics engine 14, pattern mirrors 18a and 18b, and power and control circuitry 28. Optical scanner 10 includes a dual-aperture scanner.

Optical scanner 10 may additionally include scale 36, electronic article surveillance system 38, image scanner 40, and radio frequency identification (RFID) reader 42.

Optics engine 14 includes lasers 12a and 12b, mirrored spinner 16, collectors 20a and 20b, detectors 22a and 22b, analog electronics 24, and motor 26.

Laser 12a and 12b produce laser beams. Each of lasers 12a and 12b include one or more lasers. In the example embodiment, each of lasers 12a and 12b may include up to two lasers.

Mirrored spinner 16 directs the laser beams to pattern mirrors 18a and 18b to produce a scan pattern, and receives reflected light from item 30 from pattern mirrors 18. Motor 26 rotates mirrored spinner 16.

Collectors 20a and 20b collect the reflected light from mirrored spinner 16 and direct it towards detectors 22a and 22b.

Detectors 22a and 22b convert the reflected light into electrical signals. In the example embodiment, each of detectors 22a and 22b may include up to two detectors.

Analog electronics 24 provides drive circuitry for lasers 12a and 12b and motor 26, and amplifies and filters the electrical signals from detectors 22a and 22b.

Pattern mirrors 18a direct the laser beams from laser 12a towards bar code label 32 and direct the reflected light to mirrored spinner 16. Pattern mirrors 18b direct the laser beams from laser 12b towards bar code label 32 and direct the reflected light to mirrored spinner 16.

Power and control circuitry 28 controls operation of scanner 10 and additionally processes the processed electrical signals from analog electronics 24 to obtain information encoded in bar code label 32. Power and control circuitry 28 may be connected to analog electronics 24 through one or more cables 33.

Power and control circuitry 28 also records operator selections through switches 44.

Figure 2:
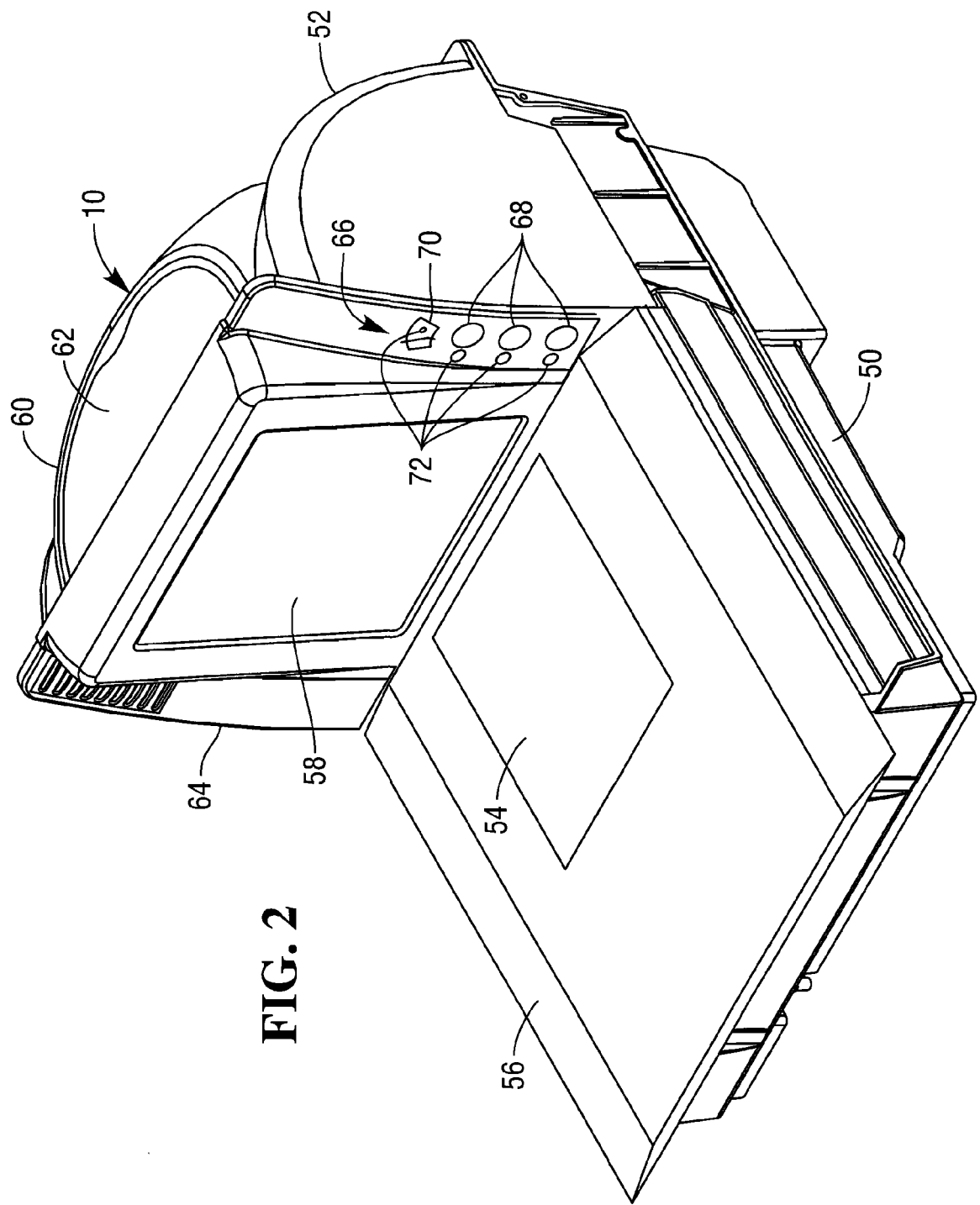
FIG. 2 is a perspective view of an example barcode scanner.
Figure 3:
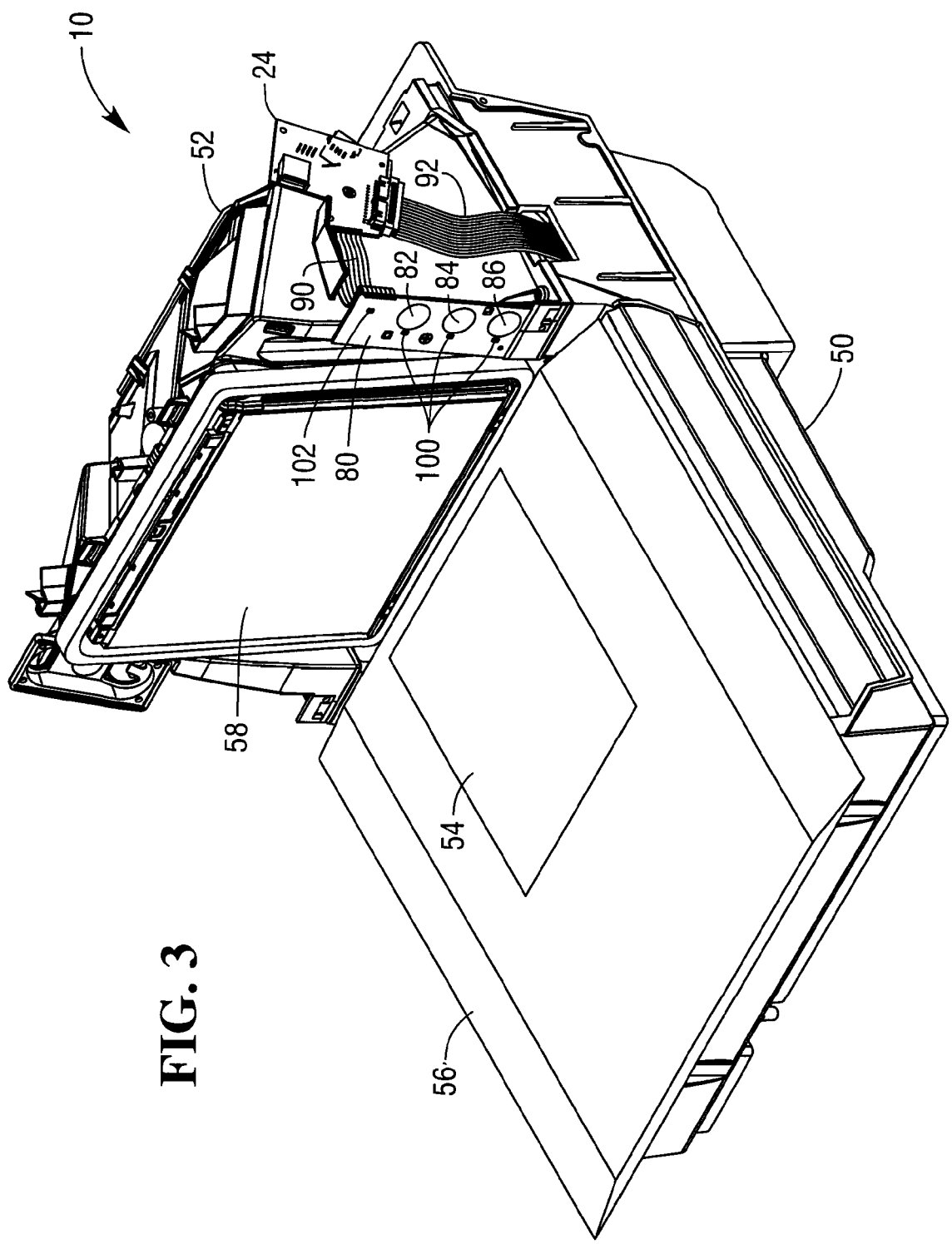
FIG. 3 is a perspective view of the example barcode scanner with a tower housing removed.

With respect to FIGS. 2-3, example scanner 10 is illustrated further. Scanner 10 includes a horizontal portion 50 and a vertical portion 52. Horizontal portion 50 includes window 54 through which scanning light beams pass. Window 54 is in scale weigh plate 56. Vertical portion 52 includes window 58 through which scanning light beams pass.

Vertical portion 52 further includes housing 60. An example housing as illustrated includes a main housing portion 62 and a bezel 64. Bezel 64 includes a switch activation area 66 containing switch indicia 68 for indicating the functions of switches 44. Switch activation area 66 further includes a window glass needs cleaning icon 70 and apertures 72 through which indicator lights 100 (FIG. 3) are visible.

With reference to FIG. 3, example scanner 10 is illustrated with housing 60 removed. Main housing portion 62 slides rearward for removal. Bezel 64 slides upward and away from vertical portion 52. Main housing portion 62 and bezel 64 do not have any electrical connections to vertical portion 52.

Switches 44 are mounted to printed circuit board 80. Printed circuit board 80 connects to analog electronics 24 through cable 90. Printed circuit board 80 may also include backlighting for switch activation area 66. Analog electronics 24 receives proximity signals from switches 44 and sends corresponding control signals to power and control circuitry 28. Analog electronics connects to power and control circuitry 28 through cable 92.

Switches 44 include non-contact proximity sensing switches, without moving parts. Advantageously, switches 44 do not have a wired electrical connection to bezel 64. Switches 44 may be capacitive switches.

Switch activation area 66 of bezel 64 is mounted adjacent switches 44. An operator wishing to activate one of switches 44 places a finger on a corresponding switch indicator 68.

Example switches 44 include a scale zeroing switch 82, a volume control switch 84, and a customizable switch 86.

Also mounted to printed circuit board 80 are indicator lights 100 and 102. Indicator lights 100 provide a visual indication to an operator that a corresponding switch 82, 84, or 86 has been activated.

When analog control circuitry 24 receives proximity signals from switches 82, 84, and 86, analog control circuitry 24 increases the intensity of lights 100 to a bright state. Otherwise, analog control circuitry 24 operates lights 100 in a dim state.

An additional capability has been added to light 100 adjacent to scale-zeroing switch 82. When scale 36 is stable at a zero weight, light 100 provides operator feedback about the state of switch 82. However, when scale weight is unstable, light 100 is in an off state. When scale weight is stable and above zero, light 100 is in a dim state. When scale weight is stable and less than zero, light 100 is in a blinking state.

Switch 86 is customizable. For example, switch 86 may be used for manual activation of EAS system 38. Other capabilities are achievable as the retailer's needs dictate.

Light 102 associated with icon 70 provides a visual indication to the operator that windows 54, 58, or both require cleaning.

Although particular reference has been made to certain embodiments, variations and modifications are also envisioned within the spirit and scope of the following claims.

What is claimed is:

1. A dual-aperture barcode scanner comprising:
   a horizontal portion including a horizontal aperture including a first window through which first scanning light beams pass;
   a vertical portion including a vertical aperture including a second window through which second scanning light beams pass, including
      a printed circuit board arranged generally vertically adjacent to a side of the vertical aperture;
      an indicator light on the printed circuit board for indicating to an operator that at least one of the first and second windows requires cleaning;
      a plurality of contactless proximity switches on the printed circuit board; and
      a removable bezel adjacent to the printed circuit board, the removable bezel including touch activation areas adjacent to the contactless proximity switches and an aperture corresponding to the indicator light;
      wherein the touch activation areas are untethered to the contactless proximity switches leaving the removable bezel free to be removed from the vertical portion when the vertical portion is serviced.

2. The scanner of claim 1, wherein the contactless proximity switches comprise capacitive switches.

3. The scanner of claim 1, wherein the contactless proximity switches comprise a scale zeroing switch.

4. The scanner of claim 3, further comprising an indicator light on the printed circuit board for providing information about a stable scale weight, wherein the bezel includes an aperture corresponding to the indicator light.

5. The scanner of claim 1, wherein the contactless proximity switches comprise a volume control switch.

6. The scanner of claim 1, wherein the contactless proximity switches comprise an electronic article surveillance system activation switch.

7. The scanner of claim 1, further comprising indicator lights on the printed circuit board, wherein the bezel includes apertures corresponding to the indicator lights.

8. A dual-aperture barcode scanner comprising:
   a horizontal portion including a horizontal aperture including a first window through which first scanning light beams pass;
   a vertical portion including a vertical aperture including a second window through which second scanning light beams pass, including
      a printed circuit board arranged generally vertically adjacent to a side of the vertical aperture and fixedly mounted within the vertical portion;
      an indicator light on the printed circuit board for indicating to an operator that at least one of the first and second windows requires cleaning;
      a plurality of contactless proximity switches on the printed circuit board;
      a removable housing; and
      a removable bezel adjacent to the removable housing and the printed circuit board, the removable bezel including touch activation areas adjacent to the contactless proximity switches and an aperture corresponding to the indicator light;
      wherein the touch activation areas are untethered to the contactless proximity switches leaving the removable bezel free to be removed from the removable housing when the vertical portion is serviced.

* * * * *